Jan. 10, 1928.

H. W. ROGERS ET AL 1,655,663

REGULATOR SYSTEM

Filed Feb. 13, 1926

Inventors:
Harold W. Rogers,
Edward H. Horstkotte,
by Alexander S. Lunt
Their Attorney.

Patented Jan. 10, 1928. 1,655,663

UNITED STATES PATENT OFFICE.

HAROLD W. ROGERS AND EDWARD H. HORSTKOTTE, OF SCHENECTADY, NEW YORK, ASSIGNORS TO GENERAL ELECTRIC COMPANY, A CORPORATION OF NEW YORK.

REGULATOR SYSTEM.

Application filed February 13, 1926. Serial No. 88,126.

Our invention relates to improvements in regulator systems for dynamo electric machines, and in particular to segregated drives such as paper machine drives and the like wherein speed regulators are provided for the respective driving motors and the regulators are interconnected to maintain a predetermined and adjustable speed relation of the motors.
One of the difficulties heretofore encountered in segregated drives of the regulator type is the hunting effect which occurs due to the regulators not being able to at all times give a regulation in such a direction and of the degree required for the momentary conditions without "overshooting."

Another difficulty encountered is that of obtaining a large number of control points or steps without introducing complications in the system, or an impractical construction of the respective regulators, or experiencing the undesirable hunting effect.

Our invention is directed to a system and apparatus whereby the above-mentioned difficulties are either entirely overcome or the effect thereof reduced to such an extent as not to be objectionable from the practical standpoint.

Our invention is particularly applicable to paper machine drives of the segregated type wherein a separate driving motor is provided for each unit or section of the machine and wherein it is required that the speed relation of the units must be maintained practically as if the units were connected to each other through mechanical driving connections, and wherein it is required that the speed relation must be adjustable to meet varying conditions. However, the invention is not necessarily limited to its application in paper machine drives, as will be understood by those skilled in the art from an understanding of the invention.

Figure 1:
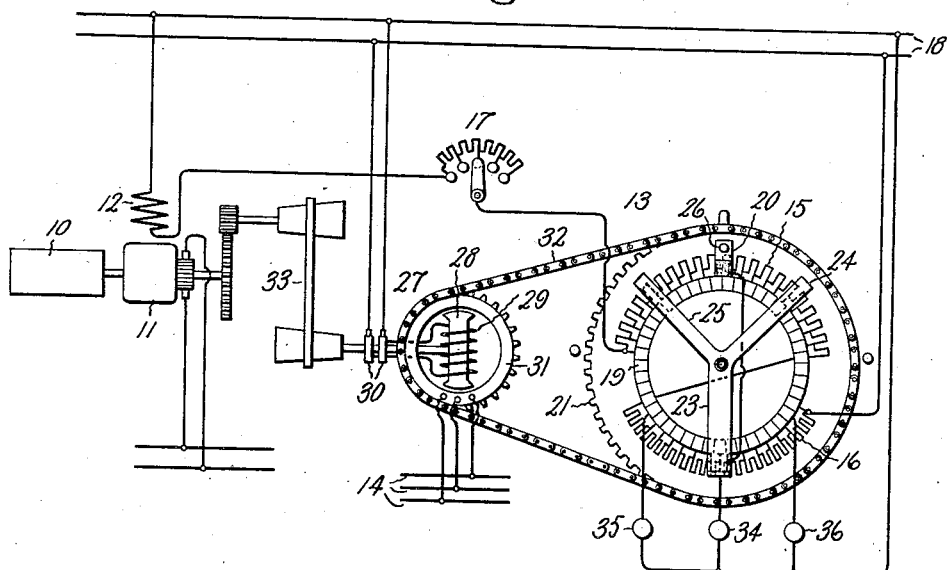
Figure 2:
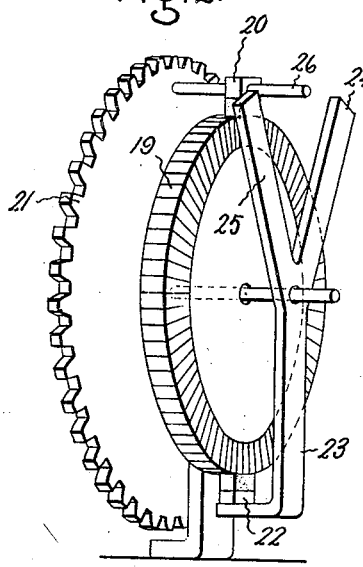
Figure 3:
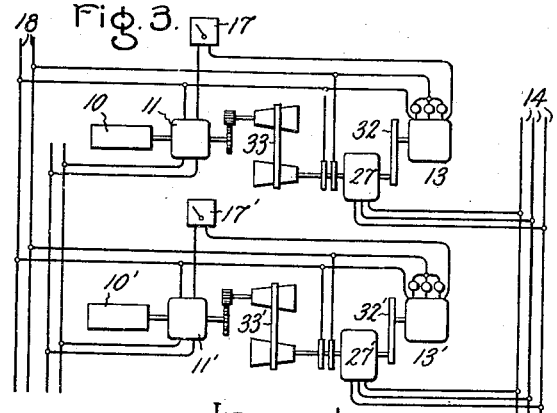

For an understanding of the invention, reference is had to the accompanying drawing, wherein Fig. 1 is a very simple diagram showing a regulator system in accordance with the invention, the system being provided with a regulator for varying the energization of the shunt field of an electric driving motor for a machine or a unit of a machine. Fig. 2 is a detail of the arrangement of Fig. 1 for the purpose of showing in perspective a commutator, the brush rigging therefore and the arrangement whereby the brushes are operated to give the desired fine and coarse regulating effect. Fig. 3 is a very simplified diagram showing a plurality of systems of Fig. 1 combined into a common system for the purpose of automatically maintaining a perdetermined speed relation between the separate driving motors of a plurality of units of a machine, such for example as separate units of a paper making machine, the speed relation of which must be accurately maintained and at the same time be capable of adjustment.

Referring to the drawing, and in particular Figs. 1 and 2, the unit 10 of the machine to be operated is arranged to be driven by the separate driving motor 11 which is indicated as of the direct current type provided with a shunt field winding 12. The desired speed of this driving motor is automatically maintained by regulating means 13 which constantly compares the speed of the driving motor with reference to a fixed speed, namely the frequency of an alternating source of supply 14. To that end, the regulating means comprising a rheostat having one portion 15 for giving a fine regulating effect and another portion 16 for giving a coarse regulating effect, these resistors being included in series relation with the shunt field 12 of the motor, and the manually adjustable rheostat 17 across the supply circuit 18. The rheostat 17 is used for adjusting the value of the motor field current so that the regulator will operate to maintain the desired motor speed.

The resistors 15 and 16 are each made up of a plurality of interconnected sections, the sections of the resistor 15 being each of materially lower resistance value than the resistance of corresponding sections of the portion 16. The various sections of the resistor portion 15 are preferably of substantially equal value and the sections of the resistor portion 16 are likewise preferably of substantially equal value. The terminals of the various sections of the resistor portions are connected to segments of a stationary commutator 19, and the arrangement is such that the resistor portions 15 and 16 may be located at any convenient place and the commutator with the various other portions of the regulating means may be located at another convenient place, as for example, on a switchboard adjacent the machine to be controlled. By reason of the fact that the resistor portions and the commutator 19 are stationary, no complications are introduced in maintaining a proper relation between these two parts of the regulating means.

The effective number of sections of the resistor portion 15 is varied by means of a brush 20 which is mechanically connected to gear 21 to be reciprocated back and forth over the commutator 19 in response to the movement of the gear. The effective number of the sections of the resistor portion 16 is varied by means of the brush 22 which is arranged to remain in the position to which it is last operated. The brush 22 is carried by a rotatable member 23 mounted for rotation about the shaft on which the gear 21 is mounted. The commutator 19 is also concentrically mounted with respect to the gear 21. This rotatable member 23 is preferably of the shape indicated, namely with two forked ends 24 and 25. The arrangement is such that the brush 20 is able to reciprocate back and forth over the commutator 19, independently of the brush 22 as long as the brush is within the limits determined by the angular spread of the forks 24 and 25, but as soon as the brush 20 is moved by the gear 21 in excess of this independent movement, either the fork 24 or the fork 25, as the case may be, is engaged by the pin 26 on which the brush 20 is mounted, and the brush 22 is thereby shifted either clockwise or counterclockwise, as the case may be, to a new position. This shifting of the brush 22 also establishes a new path of independent movement for the brush 20, so that as long as the brush 20 reciprocates over segments of the commutator 19 between the new position of the forks 24 and 25, the brush 22 will not be affected.

The gear 21 is operated in accordance with the angular displacement which occurs when the driving motor 11 tends to depart from the adjusted speed relation between this motor and the frequency of the alternating current source of supply 14. This is brought about by driving the gear 21 from an electrical dynamometer 27 which measures the phase angle difference between the driving motor 11 and the frequency of the source 14.

The dynamometer 27 is preferably of the general form indicated and is provided with one member which is driven by the motor and also a cooperating relatively movable member, one of the members being arranged to provide magnetic poles of a fixed polarity and the other member being provided with a winding adapted to be connected to an alternating current source. The member 28, which is arranged to provide magnetic poles of a fixed polarity, is arranged to be driven by the driving motor 11 and this fixed polarity member is provided with a winding 29 suitably energized through the slip rings 30 from the direct current source of supply 18. The other member of the dynamometer is provided with a winding which is not shown in the drawing, but is merely indicated as being supplied with current from the three phase alternating current supply 14. This member 31 is freely rotatable with respect to the fixed polarity member 28 driven by the driving motor and the members 28 and 31 constitute a synchronous motor of a special type in which both elements of the motor are rotatable. When there is a phase angle difference between the driving motor 11 and the current in the alternating current supply circuit 14, there will be a movement of the member 31 in such a direction and of such a degree that this phase angle difference is compensated for, as will be understood by those skilled in the art. This movement of the member 31 is utilized to operate the gearing 21 of the rheostat mechanism of the regulator, and to that end the member 30 is provided with gear teeth on its periphery and the endless chain 32 connects the member 31 and the gear 21. In order to adjust the regulator system to automatically maintain various speeds of the driving motor 11, the fixed polarity member 28 is driven through the adjustable speed cone and belt arrangement 33, as indicated. This speed cone and belt arrangement is not required to carry any appreciable amount of power and can therefore be made very light and comparatively inexpensive. By reason of the fact that an extremely small amount of power is carried through the belt connecting the speed cones, no difficulties are encountered by reason of the slippage of the belt so that for all practical purposes, the rotatable member 28 of the dynamometer is driven the same as if it were connected through gearing with the driving motor.

As thus constructed and arranged and with the parts in the various positions as indicated in Figs. 1 and 2, and assuming that the driving motor 11 has been suitably started in the ordinary way and that the belt of the speed cone adjustment device has been adjusted so that the members of the dynamometer 27 will be in their relative positions as indicated in Fig. 1, and the brushes of the rheostat 13 are in their positions as indicated in Fig. 1, for the normal conditions of operation; in other words, these various parts are in their respective positions such that the desired speed of the driving motor 11 is being maintained, the operation of my invention is as follows:

The indicating lamp 34 will be lit by reason of the fact that the brush 22 of the rheostat is in its mid position, thereby advising the operator that the motor 11 is running at the speed desired with the proper value of resistance included in the motor field circuit to maintain this desired speed. In case there is a tendency of the speed of the motor 11 to depart from the predetermined speed, the member 28 of the dynamometer 27 will shift in phase with respect to the member 31 which carries the windings energized from the three phase alternating current supply circuit 14. This will cause the member to rotate in the proper direction to compensate for the shift in phase. The arrangement will be such that in case the tendency of the motor is to decrease in speed, the member 31 of the dynamometer will rotate in the clockwise direction and thus through the endless chain 32 and the gear 21 shift the brush 20 of the rheostat to include a greater number of sections of the relatively low value resistor portion 15 in the motor field circuit. This movement of the brush 20 will be practically simultaneous with the tendency of the motor to depart from the predetermined speed relation with respect to the frequency of the alternating current mains 14 and the regulating effect will be applied almost simultaneously to the shunt field of the driving motor to restore the desired speed of the driving motor. In case the tendency of the speed of the driving motor is to increase rather than decrease as above set forth, the member 31 of the dynamometer will rotate slightly in the counterclockwise direction and thus effect the shifting of the brush 20 of the rheostat in a counterclockwise direction to reduce the number of sections of the fine portion of the rheostat.

As long as the tendency to departure is a relatively small value, the brush 20 will reciprocate back and forth between the arms 24 and 25 of the Y shaped member 23 carrying the brush 22, and the brush 22 will not be changed in position. However, if the tendency to departure is greater than the limits determined by the spread between the arms 24 and 25, the brush 22 will be shifted to include more or less of the relatively high resistance value sections of the "coarse" adjustment resistor portion 16. This will effect a larger change in the field current of the motor and the brush 20 will then be shifted toward the neutral position between the two arms 24 and 25 so as to compensate somewhat for the relatively large speed change effected. The brush 22 will remain in the position to which it is thus operated and by reason of the fact that the arms 24 and 25 are in a new position, a new limit of independent movement is established for the brush 20. In case the brush 22 should be shifted clockwise to such a position that it makes engagement with the segment to which the lamp 35 is connected, this lamp will be lit to indicate to the operator that the regulator is at practically its limit of operation for this direction of adjustment. The lamp 35 would thus indicate that the maximum regulation has been had by means of the automatic regulator introducing resistance in the field circuit of the motor. In case the brush 22 is shifted counterclockwise to such a position that engagement is made with the segment of the commutator to which the lamp 36 is connected, that would indicate to the operator that the maximum adjustment of the regulator in the other position has been had. When either one of the lamps 35 or 36 is lit, the operator will understand that some adjustment may be had to restore the regulator to its mid operating position if desirable.

In Fig. 3 we have indicated the manner in which the system of Fig. 1 is combined in a system whereby the speed relation of a plurality of separate driving motors may be automatically maintained. In the upper portion of this figure, the various parts of the system are indicated as in Fig. 1, and in the lower portion of the figure, the corresponding parts are indicated with corresponding figures, each of which has a prime affixed thereto to indicate that the parts are similar in function, although not necessarily similar in size, speed of operation, etc.

With the system as indicated in Fig. 3, by reason of the fact that the speed of each of the separate driving motors 11 and 11' is being constantly compared with reference to the frequency of the alternating current supply 14, since corresponding elements of the dynamometer are connected to this common alternating current supply circuit, the speed relation between motors 11 and 11' will be automatically maintained. By means of the speed cone and belt adjusting devices, the speed relation between the various driving motors may be very accurately adjusted to take care of the conditions imposed in practice with the employment of the system of the invention in a paper machine drive, for example. In Fig. 3 we have merely indicated two separate driving motors with their respective regulators, and we would have it understood that this is merely indicative and that any desired number of driving motors may be thus kept in any desired speed relation.

One of the advantages of our invention is that the hunting effect experienced with the ordinary type of regulator control for separate driving motors is eliminated, since the effect of the regulator is practically instantaneous with the tendency to departure from the desired speed relation, furthermore, as long as the tendency to departure is of a relatively small value, the regulating effect is a relatively small value and this fine regulating effect is divided up into a large number of steps, each of which has a comparatively small effect in governing the speed of the controlled motor.

It will also be noticed that the rheostat mechanism is small in construction and since there are comparatively few parts to be operated, these parts may be of relatively rugged construction for the amount of work to be performed thereby and the regulator thus be very reliable and effective in operation.

What we claim as new and desire to secure by Letters Patent of the United States, is:

1. In combination, a dynamo electric machine, a regulator therefor having two cooperating movable elements for controlling a variable condition of said machine, one of said elements being arranged to freely reciprocate between limits as determined by the second of said elements to produce a regulating effect of a certain degree and to shift the second element to cause the second element to produce a regulating effect of a higher degree upon movement of said first element beyond said limits, and means operated responsively to the said varying condition of said machine for operating the said first element.

2. In combination, a dynamo electric machine, a resistance regulator therefor having two cooperating movable elements for controlling a variable condition of said machine, a resistor of relatively low value varied by the first of said elements, a second resistor of relatively high value electrically connected with said first resistor and varied by the second of said elements, the first of said elements being arranged to freely reciprocate between limits as determined by the second of said elements to give a fine regulation effect by variation of said first resistor and to shift the second element to give a coarse regulation by variation of said second resistor upon movement of said first element beyond said limits, and means operated responsively to the said varying condition of said machine and connected to said first element for operating the same.

3. In combination, a driving motor, a regulator having two cooperating movable elements for controlling the speed of said motor, one of said elements being arranged to freely reciprocate between limits as determined by the second of said elements independently of the second element to produce a regulating effect of a certain degree and to shift the second element to cause the second element to produce a regulating effect of a higher degree upon movement of the first element beyond said limits, the said second element being arranged to remain in the position to which it was last shifted by said first element, and means operated responsively to a tendency of the speed of said motor to depart from a predetermined speed for operating said first element.

4. In combination, a driving motor having a shunt field winding, a resistance regulator for the said field winding, the said regulator having two cooperating movable elements for controlling the speed of said motor by varying the energization of said field winding, one of said elements being arranged to freely reciprocate between limits as determined by the second of said elements independently of the second element and to shift the second element upon movement of said first element beyond said limits, the said second element being arranged to remain in the position to which it is last operated by said first element, a resistor of relatively low value varied by said first element, a second resistor of relatively high value electrically connected with said first resistor and varied by said second element, and means for actuating said first element consisting of a member driven by the motor and a cooperating relatively movable member, one of said members being arranged to provide magnetic poles of a fixed polarity and the other member being provided with a winding adapted to be connected to an alternating current source.

5. In an electric drive wherein a plurality of units are required to run in fixed speed relationship and wherein a motor is arranged to drive each of a plurality of said units, a regulator for controlling the speed of each of a plurality of said units, each of said regulators having two cooperating elements, the first of said elements being arranged to freely reciprocate between limits as determined by the second of said elements independently of the second element to produce a regulating effect of a certain degree and to shift the second element to cause the second element to produce a regulating effect of a higher degree upon movement of the first element beyond said limits, the said second element being arranged to remain in the position to which it was last shifted by said first element, and means for actuating each of said first elements of said regulators to maintain the speed relationship of the motors fixed consisting of a member driven by the corresponding motor and a cooperating relatively movable member, one of said members being arranged to provide magnetic poles of a fixed polarity and the other member being provided with a winding adapted to be connected to an alternating current source, and a common source of alternating current for supplying each of said windings.

6. In a electric drive wherein a plurality of units are required to run in fixed speed relationship and wherein a motor having a shunt field is arranged to drive each of a plurality of said units, a resistance regulator for each of a plurality of said units for controlling the energization of the said field winding of the associated motor to control the motor speed, each of said regulators having two cooperating movable elements, one of said elements being arranged to freely reciprocate between limits as determined by the second of said elements independently of the second element and to shift the second element upon movement of said first element beyond said limits, the said second element being arranged to remain in the position to which it is last operated by said first element, a resistor of relatively low value varied by said first element, a second resistor of relatively high value electrically connected with said first resistor and varied by said second element, and means for actuating each of said first elements of said regulators to maintain the speed relationship of the motors fixed consisting of a member driven by the corresponding motor and a cooperating relatively movable member, one of said members being arranged to provide magnetic poles of a fixed polarity and the other member being provided with a winding adapted to be connected to an alternating current source, and a common source of alternating current for supplying each of said windings.

In witness whereof, we have hereunto set our hands this 12th day of February, 1926.

HAROLD W. ROGERS.
EDWARD H. HORSTKOTTE.